(12) United States Patent
Tanaka

(10) Patent No.: US 6,252,655 B1
(45) Date of Patent: *Jun. 26, 2001

(54) DISTANCE MEASURING APPARATUS

(75) Inventor: Tomohiro Tanaka, Kawasaki (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/110,946

(22) Filed: Jul. 7, 1998

(30) Foreign Application Priority Data

Jul. 7, 1997 (JP) .................................................. 9-181473

(51) Int. Cl.$^7$ ...................................................... G01C 3/08
(52) U.S. Cl. .......................................... 356/5.06; 356/5.01
(58) Field of Search ......................... 356/4.01, 5.01–5.15

(56) References Cited

U.S. PATENT DOCUMENTS

| | | | |
|---|---|---|---|
| 3,574,461 | * | 4/1971 | Yurasek et al. . |
| 3,619,058 | * | 11/1971 | Hewlett et al. . |
| 3,650,628 | * | 3/1972 | Tawfik et al. . |
| 3,728,026 | * | 4/1973 | Idestrom et al. . |
| 3,900,260 | * | 8/1975 | Wendt . |
| 4,498,764 | * | 2/1985 | Bolkow et al. . |
| 4,521,107 | * | 6/1985 | Chaborski et al. . |

FOREIGN PATENT DOCUMENTS 53-1553   1/1978   (JP) .

* cited by examiner

*Primary Examiner*—Stephen C. Buczinski
(74) *Attorney, Agent, or Firm*—Foley & Lardner

(57) ABSTRACT

The present invention relates to a distance measuring apparatus which computes the distance from the apparatus to a target by measuring a period of time from when pulse light is emitted toward the target until a reflected component from the target is received. This apparatus comprises a structure for enabling accurate distance measurement by comparing a result of measurement concerning measurement pulse light emitted into a measurement optical path and a result of measurement concerning reference pulse light emitted into a reference optical path. In particular, this apparatus specifies, as the reflected pulse light from the target, the reflected component of the measurement pulse light initially detected after the measurement pulse light is emitted, and adjusts light quantity such that the light quantity of the initially detected reflected component coincides with that of the reference pulse light. Prevented as a consequence of this configuration is an erroneous operation in which undesirable reflected components caused by obstacles and multiple reflection are detected.

7 Claims, 8 Drawing Sheets

DISTANCE MEASURING APPARATUS

BACKGROUND OF THE INVENTION

1) Field of the Invention

The present invention relates to a distance measuring apparatus which emits pulse light toward a target and computes the distance to the target by measuring a period of time from the emission of pulse light until the detection of reflected pulse light.

1) Related Background Art

Conventionally known as an apparatus which emits a laser pulse toward a target, receives the light reflected by the target, and computes the distance to the target is, for example, that disclosed in Japanese Patent Application Laid-Open No. 53-1553.

This conventional distance measuring apparatus comprises a single measuring system which emits a laser pulse into a measurement optical path between the apparatus and a target and receives the reflected pulse light propagated through the measurement optical path; and computes the distance to the target according to the difference in time between the timing at which the laser pulse is emitted by the single measuring system and the timing at which the reflected pulse light is received by the same system.

In particular, in order to eliminate reflected signals from a reflective object located farther than the target, the conventional distance measuring apparatus adjusts the beam expansion of the laser light emitted therefrom such that the laser light does not reach anywhere other than the target. Also, the conventional distance measuring apparatus sequentially records temporal information of the reflected signal being received each time a laser pulse is emitted toward the target, and computes information about the distance to the target on the basis of the finally recorded temporal information of the reflected signal.

SUMMARY OF THE INVENTION

As a result of studies of the above-mentioned conventional distance measuring apparatus, the inventor has found the following problems.

Namely, the conventional distance measuring apparatus is based on a technique in which the angle of divergence of emitted laser light is restricted so that the laser light correctly impinges on the target. When the target has a very high reflectivity as in the case of a prism, however, there is a possibility of the light reflected by the prism being reflected by an emission optical system for adjusting the angle of divergence of the laser light and the like or a light receiving optical system for receiving the reflected light, thereby occurring multiple reflection directed toward the prism again. In this case, a plurality of reflected light beams caused by the multiple reflection are received, thus making it difficult to measure the distance with a high accuracy.

Also, unless the angle of divergence of emitted laser light can be controlled correctly; of the emitted laser light, the light reflected by reflective objects other than the target may be received as well.

Therefore, it is an object of the present invention to provide a distance measuring apparatus having a structure which allows the distance to be measured with a high accuracy without being influenced by its environment of measurement even when a reflective object exists behind the target or when multiple reflection occurs.

The distance measuring apparatus according to the present invention comprises a first measuring system for detecting, of measurement pulse light emitted into a measurement optical path toward a target, information concerning a reflected component from the target; a second measuring system for detecting information concerning reference pulse light emitted into a reference optical path; and a structure which enables highly accurate distance measurement by comparing results of measurement obtained from these measuring systems.

Specifically, the distance measuring apparatus according to the present invention comprises an emission system for emitting measurement pulse light into a measurement optical path between the apparatus and a target, and emitting reference pulse light into a reference optical path different from the measurement optical path; a light receiving system for receiving a reflected component of the measurement pulse light that propagates through the measurement optical path and receiving the reference pulse light that propagates through the reference optical path; a time measuring system for measuring, at least, a period of time from when the measurement pulse light is emitted from the emission system until the reflected component of the measurement pulse light reaches the light receiving system; a light quantity adjusting mechanism for adjusting a light quantity of the reflected component of the measurement pulse light that propagates through the measurement optical path; and a light quantity control system for controlling the light quantity adjusting mechanism.

Here, the time measuring system measures a period of time from when the measurement pulse light is emitted from the emission system until the reflected component of the measurement pulse light initially reaches the light receiving system, and a period of time from when the reference pulse light is emitted from the emission system until the reference pulse light reaches the light receiving system.

In particular, the light quantity control system controls the light quantity adjusting mechanism on the basis of the difference between the light quantity of the reflected component initially reaching the light receiving system after the measurement pulse light is emitted from the emission system into the measurement optical path and the light quantity of the reference pulse light reaching the light receiving system. More specifically, the light quantity control system comprises a detecting section for detecting the reflected component of the measurement pulse light initially reaching the light receiving system after the measurement pulse light is emitted from the emission system into the measurement optical path; a signal level changing section for blocking or attenuating an electric signal fed from the light receiving system after the initially reaching reflected component is detected by the detecting section; and a control section for controlling the light quantity adjusting mechanism on the basis of the electric signal from the signal level changing section.

Preferably, the light quantity control system controls the light quantity adjusting mechanism such that a peak light quantity level of the reflected component of the measurement pulse light initially reaching the light receiving system after the measurement pulse light is emitted from the emission system into the measurement optical path equals a peak light quantity level of the reference pulse light reaching the light receiving system. Thus, the light quantity control system equilibrates light quantity such that the light quantity of the reflected component from the target becomes a predetermined standard level, thereby, even in the case where a reflected component having a large light quantity reaches the light receiving system from an object located behind the target, the distance to the target can be measured correctly.

Also, the light quantity control system blocks or attenuates, of control signals for controlling the light quantity adjusting mechanism, electric signals corresponding to reflected components of the measurement pulse light reaching the light receiving system in the second place and later. As a consequence, even in the case where the light receiving system receives a plurality of reflected components propagating through the measurement optical path, light quantity is always equilibrated for the light quantity of the initially received reflected component, whereas no light quantity equilibration is carried out for undesirable reflected components received in the second place and later. Accordingly, in the distance measuring apparatus according to the present invention, the light quantity of the reflected component of the measurement pulse light initially reaching the light receiving system is set to the above-mentioned standard level, and information concerning the initially reaching reflected component is fed into a receiving timing detecting section, thereby the distance to the target closest to the apparatus is always measured, while preventing unstable measurement operations such as those in which computed values of distance greatly varying due to fluctuations in level of reflected components or in which an intermediate distance between two targets is computed.

Further, in the distance measuring apparatus according to the present invention, the light quantity control system holds a level of an electric signal fed out from the light receiving system in response to the light quantity peak of the measurement pulse light initially reaching the light receiving system after the measurement pulse light is emitted from the emission system into the measurement optical path, and controls the light quantity adjusting mechanism on the basis of thus held level. Since the light quantity equilibration in the present invention is thus carried out in the light quantity control system provided separately from the signal system for measuring time, switching noise which may be caused by changes in gain or the like would not mingle into the time measuring system, whereby the distance measuring apparatus according to the present invention can perform stable measurement operations.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 5A to 5F are views for explaining operations of respective parts in the distance measuring apparatus shown in FIG. 2, in which FIG. 5A shows output 24 of an amplifier section 10 before light quantity equilibration, FIG. 5B shows control signal 25 fed out from a signal edge detecting section 12, FIG. 5C shows output 30 of a signal level changing section 13, FIG. 5D shows output 31 of a signal level detecting section 14, FIG. 5E shows output 24 of the amplifier section 10 after the light quantity equilibration, and FIG. 5F shows output 26 of a receiving timing detecting section 11;

FIGS. 8A to 8D are views for explaining a first problem of the distance measuring apparatus shown in FIG. 7, in which FIG. 8A shows output 75 of an amplifier section 70 before light quantity equilibration, FIG. 8B shows output 84 of a signal level detecting section 72, FIG. 8C shows output 75 of the amplifier section 70 after the light quantity equilibration, and FIG. 8D shows output 76 of a receiving timing detecting section 71; and FIGS. 9A to 9D are views for explaining a second problem of the distance measuring apparatus shown in FIG. 7, in which FIG. 9A shows output 75 of the amplifier section 70 before light quantity equilibration, FIG. 9B shows output 84 of the signal level detecting section 72, FIG. 9C shows output 75 of the amplifier section 70 after the light quantity equilibration, and FIG. 9D shows output 76 of the receiving timing detecting section 71.

DETAILED DESCRIPTION OF THE PREFERRED EMBODIMENTS

In the following, embodiments of the present invention will be explained with reference to FIGS. 1 to 4, 5A to 5F, 6, 7, 8A to 8D, and 9A to 9D. The embodiments explained hereinafter, however, would not restrict the technical scope of the present invention. In the following, parts identical to each other will be referred to with numerals identical to each other, without repeating their overlapping explanations.

Figure 1:
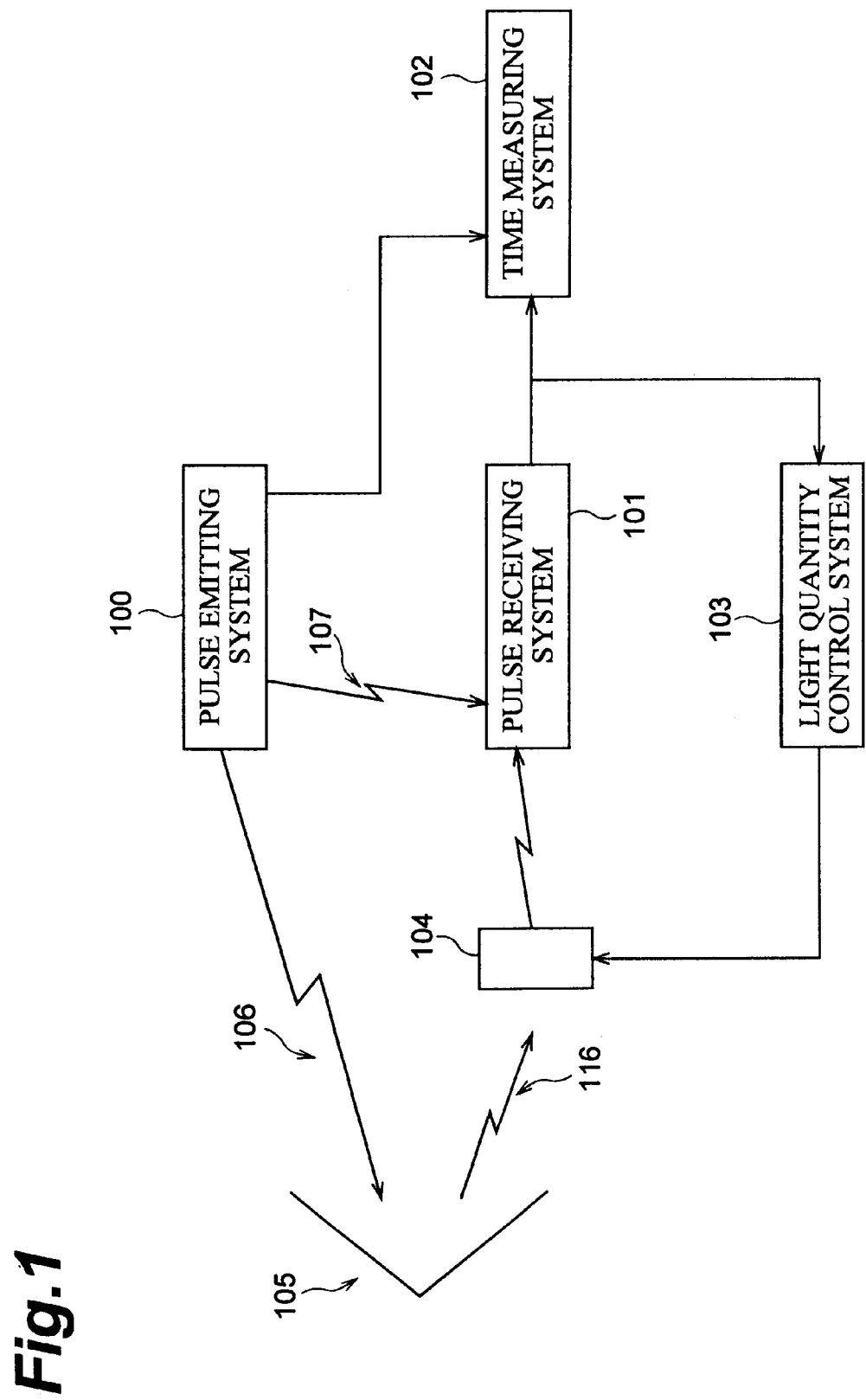
FIG. 1 is a conceptual view for explaining individual functions of a distance measuring apparatus according to the present invention.

FIG. 1 is a conceptual view for explaining individual functions of a distance measuring apparatus according to the present invention. The distance measuring apparatus according to the present invention comprises a pulse emitting system 100 for emitting measurement pulse light 106 into a measurement optical path (external optical path) or reference pulse light 107 into a reference optical path (internal optical path); a pulse light receiving system 101 for receiving a reflected component 116 of the measurement pulse light 106 that propagates through the measurement optical path or the reference pulse light 107 that propagates through the reference optical path; a light quantity control system 103 for controlling a light quantity adjusting mechanism 104 which adjusts the light quantity of the reflected component 116; and a time measuring system 102 for measuring a period of time from the emission to receiving of each of the measurement pulse light 106 and reference pulse light 107.

The pulse emitting system 100 selectively emits the measurement pulse light 106 into the measurement optical path toward a target 105 or the reference pulse light 107, which is used for obtaining a predetermined standard level employed for light quantity equilibration, into the reference optical path disposed within the apparatus, as desired. The pulse light receiving system 101 receives the reflected component 116 of the measurement pulse light 106 that propagates through the measurement optical path or the reference pulse light 107 that propagates through the reference optical path, and converts thus received light into an electric signal, which is then fed to the time measuring system 102. The light quantity control system 103 controls the light quantity adjusting mechanism 104 disposed on the measurement optical path, thereby carrying out light quantity equilibration for making the detected light quantity of the reflected component 116 equal the detected light quantity of the reference pulse light 107 that propagates through the reference optical path. The time measuring system 102 measures a difference in time between the timing at which the light pulse is emitted from the pulse emitting system 100 and the timing at which the light pulse is received by the light pulse receiving system 110. From this time difference and the velocity of light, the distance from the apparatus to the target 105 is computed.

Figure 2:
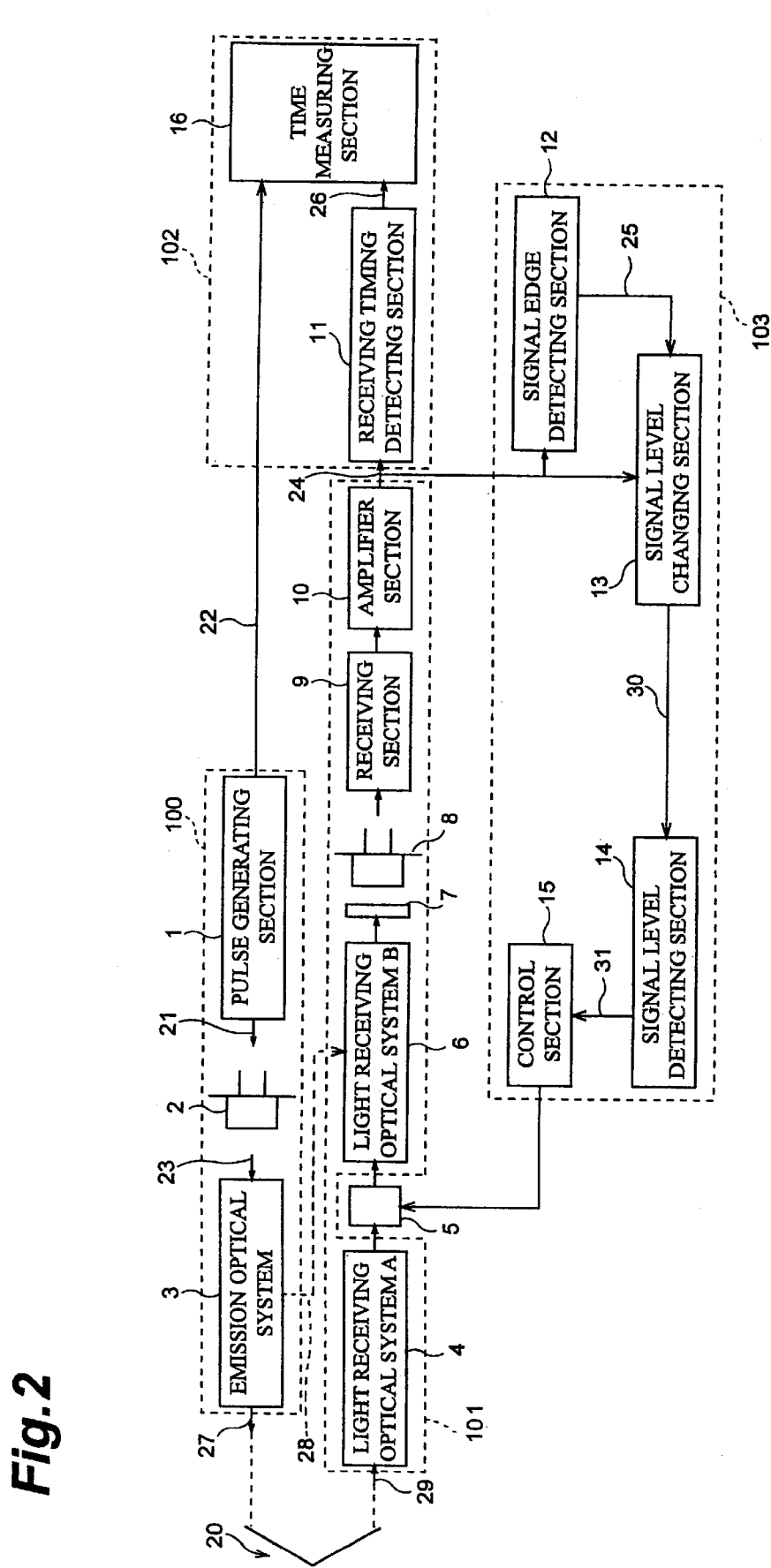
FIG. 2 is a block diagram for explaining a detailed configuration of the distance measuring apparatus according to the present invention.

FIG. 2 is a block diagram showing a detailed configuration of the distance measuring apparatus shown in FIG. 1. The individual functional blocks in FIG. 1 correspond to respective parts surrounded by dotted lines in FIG. 2.

In the distance measuring apparatus according to the present invention, as shown in FIG. 2, the system for measuring the distance to a target by utilizing pulse light comprises a structure for adjusting the light quantity of the reflected pulse light from the target, and a structure for measuring the difference in time between the emission timing of the pulse light and the receiving timing of the reflected pulse light.

First, a pulse generating section 1 outputs, in synchronization with an edge of an output signal from an oscillator disposed therein, a drive signal 21 for driving a laser diode 2. In response to the drive signal 21, the laser diode 2 emits pulse light 23 to an emission optical system 3. According to a signal from a microcomputer, the emission optical system 3 selectively emits measurement pulse light 27 into a measurement optical path outside the apparatus or reference pulse light 28 into a reference optical path disposed within the apparatus. Here, whether to emit the measurement pulse light 27 or reference pulse light 28 is selected by a mechanism within the emission optical system in accordance with an instruction from the microcomputer.

The measurement pulse light emitted into the measurement optical path is propagated toward a target 20 located at a measuring point. Then, a reflected component 29 of the measurement pulse light 27 reflected by the target 20 is collected by a light receiving optical system A 4 and passes through a light quantity adjusting mechanism 5 constituted by an optical attenuator or the like, a light receiving optical system B 6, and an optical filter 7, so as to reach a light receiving surface of an avalanche photodiode 8. Thus reaching light component is photoelectrically converted by the avalanche photodiode 8 into an electric signal, which is then converted by a receiving section 9 into a voltage, and the resulting voltage signal is fed into and amplified by an amplifier section 10. The signal amplified by the amplifier section 10 is sent to a signal level detecting section 14 temporarily by way of a signal edge detecting section 12 and a signal level changing section 13, and is also sent to a receiving timing detecting section 11. On the other hand, the reference pulse light 28 propagating through the reference optical path within the apparatus is directly received by the avalanche photodiode 8 by way of the light receiving optical system B 6.

The detected light quantity of the reflected component 29 that propagates through the measurement optical path largely depends on the reflectivity of the target 20 and the distance from the apparatus to the target 20. As a consequence, light quantity equilibration is carried out such that thus detected light quantity equals the detected light quantity of the reference pulse light 28 that has been set to a predetermined standard level beforehand.

The signal level detecting section 14, which is constituted by a peak detecting circuit for holding the peak level of output 24 of the amplifier section 10, outputs to a control section 15 a signal 31 indicative of a voltage in proportion to thus held peak level. The control section 15, which is constituted by a microcomputer, a motor, and the like, compares output levels 31 from the signal level detecting section 14 respectively corresponding to the reference pulse light 28 propagating through the reference optical path and the reflected component 29 propagating through the measurement optical path. Then, the control section 15 rotates the optical attenuator included in the light quantity adjusting mechanism 5, such that these two output levels become identical to each other, thereby adjusting the detected light quantity of the reflected component 29 that propagates through the measurement optical path. As a consequence of this light quantity equilibration, the light quantity of the reflected component 29 and that of the reference pulse light 28 can be made equal to each other, thereby equalizing delay characteristics within the receiving circuit caused by these pulses 28, 29.

Time measurement is carried out as explained in the following. Namely, after the difference in received signal levels between the reference pulse light 28 and reflected component 29 falls within a predetermined tolerance due to the above-mentioned light quantity equilibration, time measurement is effected by a microcomputer. Here, depicted time measuring section 16 is included in the microcomputer.

First, in the time measurement, of the pulse light 23 emitted from the laser diode 2 in response to the drive signal 21 from the pulse generating section 1, the measurement pulse light 27 is emitted into the measurement optical path by way of the emission optical system 3. At the same time, a measurement start signal 22 is supplied to the time measuring section 16.

On the other hand, the reflected component 29 from the target 20 is photoelectrically converted by the avalanche photodiode 8. The output 24 of the amplifier section 10 set to an appropriate amplitude level by the light quantity equilibration is sent to the receiving timing detecting section 11. The receiving timing detecting section 11, which is constituted by a comparator, a differentiating circuit, and the like, detects a peak timing of its input signal 24 and sends thus detected receiving timing signal 26 to the time measuring section 16.

Then, the time measuring section 16 measures the difference (inputted timing difference) between the respective times at which the measurement start signal 22 and the receiving timing signal 26 are generated, and computes the distance from the apparatus to the target 20 according to an operation further taking account of the velocity of light. Here, the electric delay time within the apparatus is canceled when, after a similar time difference measuring operation is carried out for the reference pulse light 28 that propagates through the reference optical path, the difference between the measured value concerning the measurement optical path and the measured value concerning the reference optical path is taken out.

Figure 3:
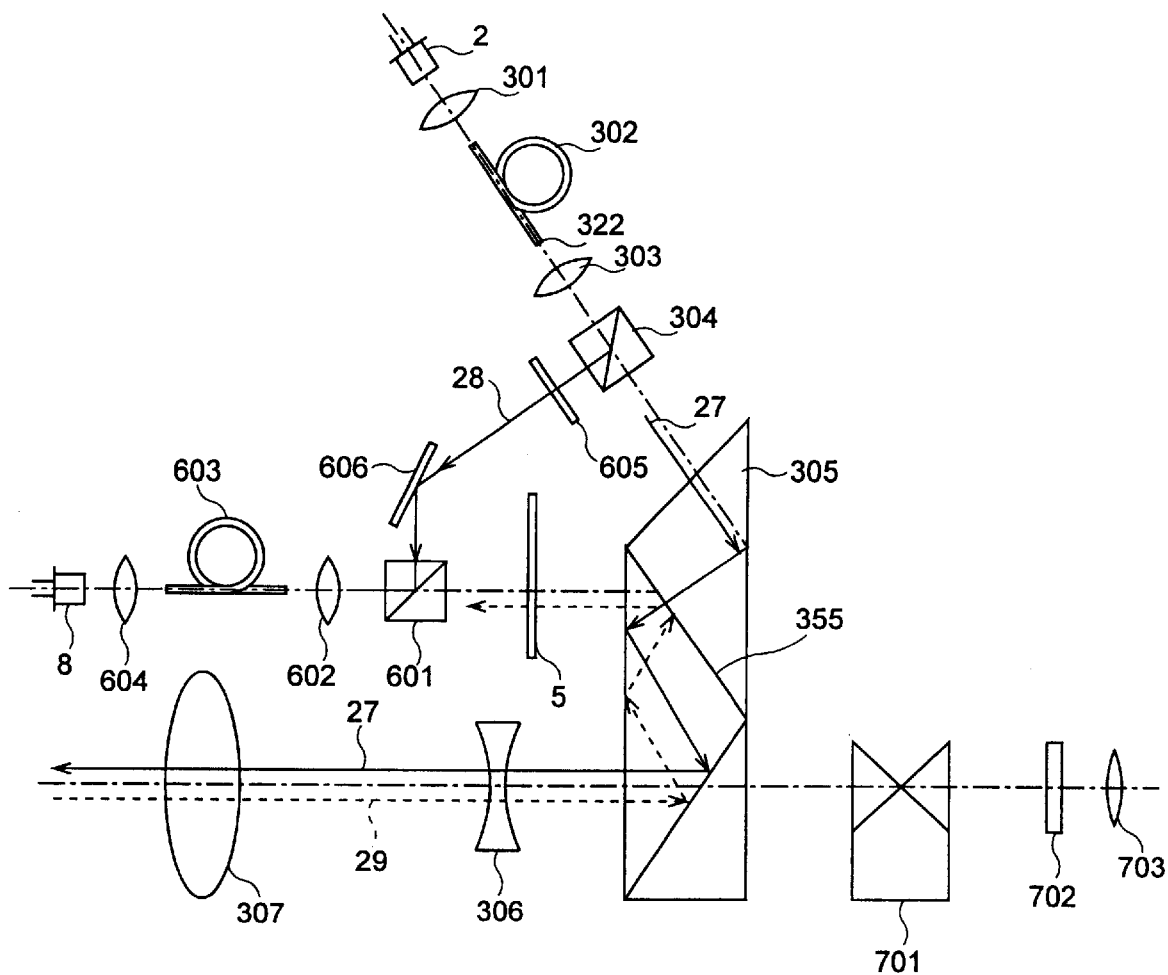
FIG. 3 is a view showing a specific configuration of the distance measuring apparatus shown in FIG. 2.
Figure 4:
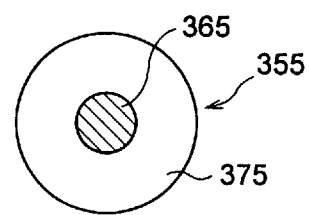
FIG. 4 is a view showing a configuration of a light splitting surface 355 in a dichroic prism 305 shown in FIG. 3.

FIG. 3 is a view showing a specific configuration of the distance measuring apparatus shown in FIG. 2. FIG. 4 is a view showing a structure of a light splitting surface 355 in a dichroic prism shown in FIG. 3.

In FIG. 3, pulse light emitted from the laser diode 2 is collected by a lens 301 so as to be made incident on an optical fiber 302. After being emitted from the optical fiber 302, the pulse light is made incident on a splitting prism 304 by way of a lens 303, so as to be separated into the reference pulse light 28 emitted into the reference optical path and the measurement pulse light 27 emitted into the external measurement optical path.

The measurement pulse light 27 propagates through a dichroic prism 305 as depicted, so as to irradiate an external target by way of a focusing lens 306 and an objective lens 307. Here, the light splitting surface 355 in the dichroic prism 305 is concentrically divided into a transmitting area 365 and a reflecting area 375 as shown in FIG. 4, thereby the measurement pulse light 27 directed toward the target passes through the centrally located transmitting area 365 so as to be emitted outside the apparatus.

On the other hand, the reflected component 29 from the target enters the dichroic prism 305 by way of the objective lens 307 and the focusing lens 306, and then is reflected by the reflecting area 375 located at the circumferential part of the light splitting surface 355. Subsequently, the reflected component 29 is made incident on a splitting prism 601 by way of the light quantity adjusting mechanism (filter 5), and then arrives at the light receiving surface of the avalanche photodiode 8 by way of a lens 602, an optical fiber 603, and a lens 604.

Here, after being separated by the splitting prism 304, the reference pulse light 28 propagating through the reference optical path passes through a fixed light quantity adjusting filter 605 and is made incident on the splitting prism 601 by way of a mirror 606. The reference pulse light 28 incident on the splitting prism 601 reaches the entrance surface of the avalanche diode 8 by way of the same optical path as that for the reflected component 29.

In this apparatus, whether to emit pulse light into the measurement optical path or the reference optical path is chosen by selecting one of them in a time division fashion (the selection being instructed by the microcomputer including the time measuring section). Specifically, the reflecting end of the splitting prism 304 is provided with an optical path blocking sector. As a light shielding plate adapted to turn this optical path blocking sector by 90 degrees in accordance with an instruction from the microcomputer blocks one of the optical paths, the other optical path is selected.

In addition, since visible light of collimation is transmitted through the dichroic prism 305, it can be observed as an erect image by way of a reticle 702 and an eyepiece 703 after being inverted by a Porro prism 701 which is disposed as depicted.

In the distance measuring apparatus shown in FIG. 3, while it has been explained that the reflected component 29 from the target is reflected by the light splitting surface 355, a part of the reflected component 29 is transmitted through the light splitting surface 355 so as to return toward the laser 2. Thus returned part of the reflected component is presumed to be reflected again by the exit end 322 of the optical fiber 302, thereby generating multiple reflection.

Here, light quantity equilibration is an operation for making the light quantity of the reflected component 29 in the measurement pulse light 27 that propagates through the measurement optical path equal the light quantity of the reference pulse light 28 that propagates through the reference optical path. In this embodiment, when detecting a plurality of reflected components, the light quantity changing mechanism 5 is controlled such that the initially detected reflected component is always set to a predetermined standard level as the reflected component 29 from the target. This feature will be explained hereinafter with reference to waveforms in individual parts.

FIGS. 5A to 5F are waveform charts indicating operations of the individual parts in the distance measuring apparatus according to the present invention.

Figure 5A:
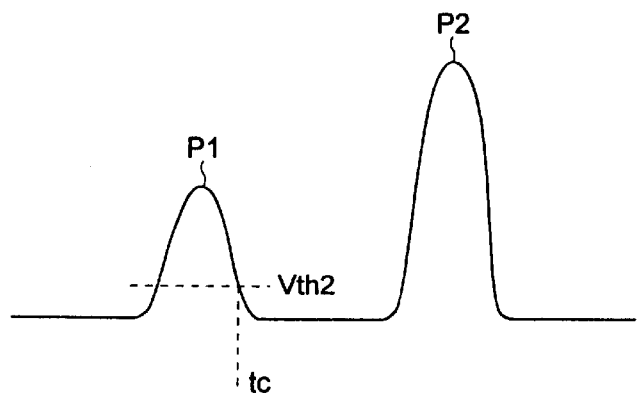

FIG. 5A indicates the output pulse 24 of the amplifier section 10, before the light quantity equilibration, in response to the reflected component 29 in the measurement pulse light 27 that propagates through the measurement optical path. This waveform indicates the case where an object having a high reflectivity exists behind the target 20. The second pulse P2 reflected by the object having a high reflectivity has a pulse level higher than that of the first pulse P1 reflected by the target 20.

Figure 5B:
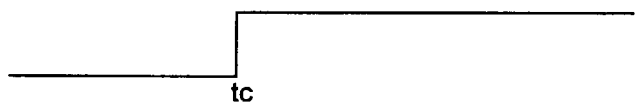

The waveform of FIG. 5B indicates the control signal 25 of the signal edge detecting section 12 in response to the output 24 shown in FIG. 5A. When the output pulse 24 of the amplifier section 10 is a positive pulse, the signal edge detecting section 12 sets the control signal 25 to a high level "H" at a point of time tc where the falling edge of the positive pulse traverses the threshold level $V_{th2}$ of the signal edge detecting section 12. The signal level changing section 13 lowers the gain with respect to input and output signals in synchronization with the high level "H" of the control signal 25.

When the output pulse 24 of the amplifier section 10 is a negative pulse, the control signal 25 is set to the high level "H" at a point of time where the rising edge of the negative pulse traverses the threshold level.

Figure 5C:
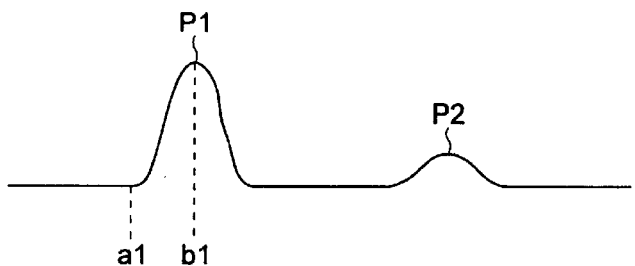

The waveform of FIG. 5C indicates the output 30 of the signal level changing section 13 in response to the output 24 in FIG. 5A. Before the point of time tc where the control signal 25 becomes the high level "H," the gain of the signal level changing section 13 maintains its initial level. Accordingly, the output pulse 24 of the amplifier section 10 for the first pulse P1 is fed to the signal level detecting section 14 as a pulse having a magnitude conforming to the gain of the signal level changing section 13, whereas signals for the second pulse P2 and later are greatly attenuated.

Figure 5D:
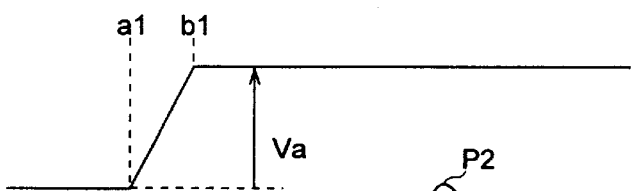

The waveform of FIG. 5D indicates the output 31 of the signal level detecting section 14 in response to the output 30 in FIG. 5C. Since the signal level detecting section 14 is constituted by a peak detecting circuit for holding the peak level of the input pulse 30, it holds the peak level of the first pulse P1 having the highest peak level, and sends to the light quantity control section 15 a voltage $V_a$ corresponding this peak level. In FIGS. 5C and 5D, a1 and b1 each indicate the same timing.

Figure 6:
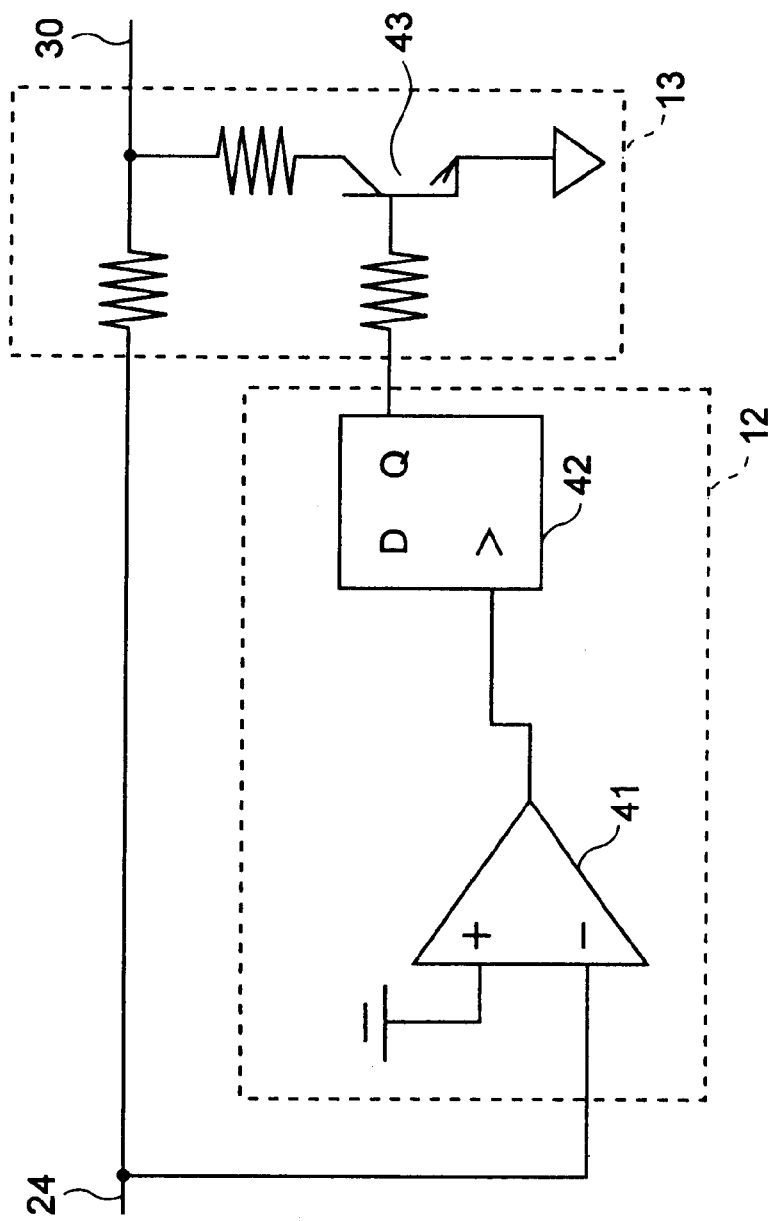
FIG. 6 is a circuit diagram showing a configuration of the signal edge detecting section 12 and signal level changing section 13 in the distance measuring apparatus shown in FIG. 2.

The signal edge detecting section 12 and the signal level changing section 13 will further be explained in detail with reference to FIG. 6.

When a positive pulse from the amplifier section 10 is fed into a comparator 41 constituting the signal edge detecting section 12, the comparator 41 outputs to a flip-flop 42 a negative pulse converted to a digital level.

The Q output of the D-type flip-flop 42 shifts from a low level "L" to a high level "H" in synchronization with the rear edge of the comparator 41. As the resulting signal is fed into a transistor 43 constituting the signal level changing section 13, the transistor 43 is turned on from its off state.

When the transistor 43 is in the off state, the output 24 of the amplifier section 10 passes through the signal level changing section 13 as it is without being attenuated. When the transistor 43 is in the on state, the output 24 is attenuated in conformity to the division ratio of resistors and then is outputted.

Thus, in this embodiment of the present invention, light quantity equilibration is always carried out by the voltage $V_a$ corresponding to the peak level of the first pulse P1 (the reflected component 29 initially received by the avalanche photodiode 8). Since the detected light quantity of the reflected component 29 that propagates through the measurement optical path greatly changes depending on the reflectivity of the target and the distance thereto as mentioned above, the light quantity equilibration adjusts this light quantity such as to make it identical to the detected light quantity of the reference pulse light 28 that propagates through the reference optical path, that of the reference pulse light 28 having been adjusted to a predetermined standard level beforehand.

Namely, the control section 15, which is constituted by a microcomputer, a motor, and the like, compares the output of the signal level detecting section 14 in response to the reference pulse light 28 propagating through the reference optical path set within the apparatus with the output $V_a$ from the signal level detecting section 14 in response to the first pulse P1 reaching the avalanche photodiode 8 among the reflected components of the measurement pulse light 27 that propagates through the measurement optical path. Then, the control section 15 rotates the optical attenuator included in the light quantity changing mechanism 5 such that these two output levels equal each other, thereby controlling the detected light quantity of the reflected component 29. As a result, the reflected component expected to reach initially can be employed as the reflected component from the target, and its light quantity can be caused to match the light quantity of the reference pulse light 28.

Figure 5E:
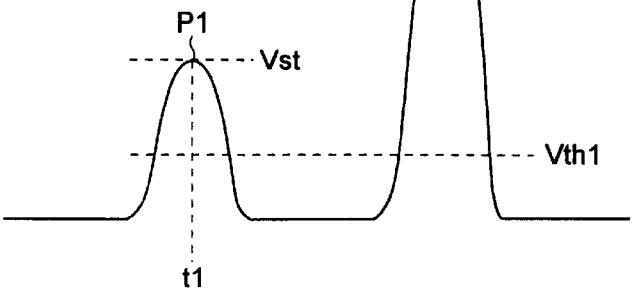

The waveform of FIG. 5E indicates the output pulse 24 of the amplifier section 10, after the light quantity equilibration, in response to the initially reaching reflected component 29. As mentioned above, in this embodiment of the present invention, the light quantity equilibration is carried out such that the peak level of the first reflected pulse P1 coincides with the standard level $V_{st}$. Namely, even when there is the second reflected pulse P2 having a higher peak level, the first pulse P1 would not be attenuated.

After the difference in signal level between the reference pulse light 28 and the initially reaching reflected component 29 falls within a predetermined range, a microcomputer (including the time measuring section 16) carries out actual distance measurement.

First, in the distance measuring operation, of the light pulse 23 generated by the laser diode 2 in response to the drive signal 21 from the pulse generating section 1, the measurement pulse light 27 is emitted into the measurement optical path by way of the emission optical system 3. At the same time, the measurement start signal 22 is supplied to the time measuring section 16. On the other hand, the reflected component 29 from the target 20 is photoelectrically converted by the avalanche photodiode 8. Upon the above-mentioned light quantity equilibration, the amplifier section 10 adjusts the signal level in response to the first light pulse to an appropriate level, and sends the resulting output 24 to the receiving timing detecting section 11.

The receiving timing detecting section 11, which is constituted by a comparator, a differentiating circuit, and the like, detects the timing of the peak of the input signal 24 and sends the receiving timing signal 26 to the time measuring section 16.

Figure 5F:

The waveform of FIG. 5F indicates the output 26 of the receiving timing detecting section 11 in response to the output 24 in FIG. 5E. In this embodiment of the present invention, the first pulse P1 reflected by the target always becomes the standard level $V_{st}$. Since the standard level $V_{st}$ is set to a magnitude having a sufficient margin with respect to the threshold level $V_{th1}$ of the receiving timing detecting section 11, the receiving timing always coincides with the peak timing t1 of the first pulse P1.

The time measuring section 16 determines the difference in time between the measurement start signal 22 and the receiving timing signal 26 by counting clocks of a standard clock (not depicted) whose frequency has been known correctly and measuring deviations in phase between the standard clock and the measurement start signal 22 and receiving timing signal 26. Similar measurement is also carried out for the reference optical path, and data concerning the above-mentioned time difference in the measurement optical path and reference optical path are subtracted. Consequently obtained is a light pulse running time in which the delay time of the electric system has been canceled, and the distance to the target 20 is computed by an operation based on this running time and the velocity of light.

In the following, effects of the distance measuring apparatus according to the present invention will be explained with reference to FIGS. 7, 8A to 8D, and 9A to 9D.

Figure 7:
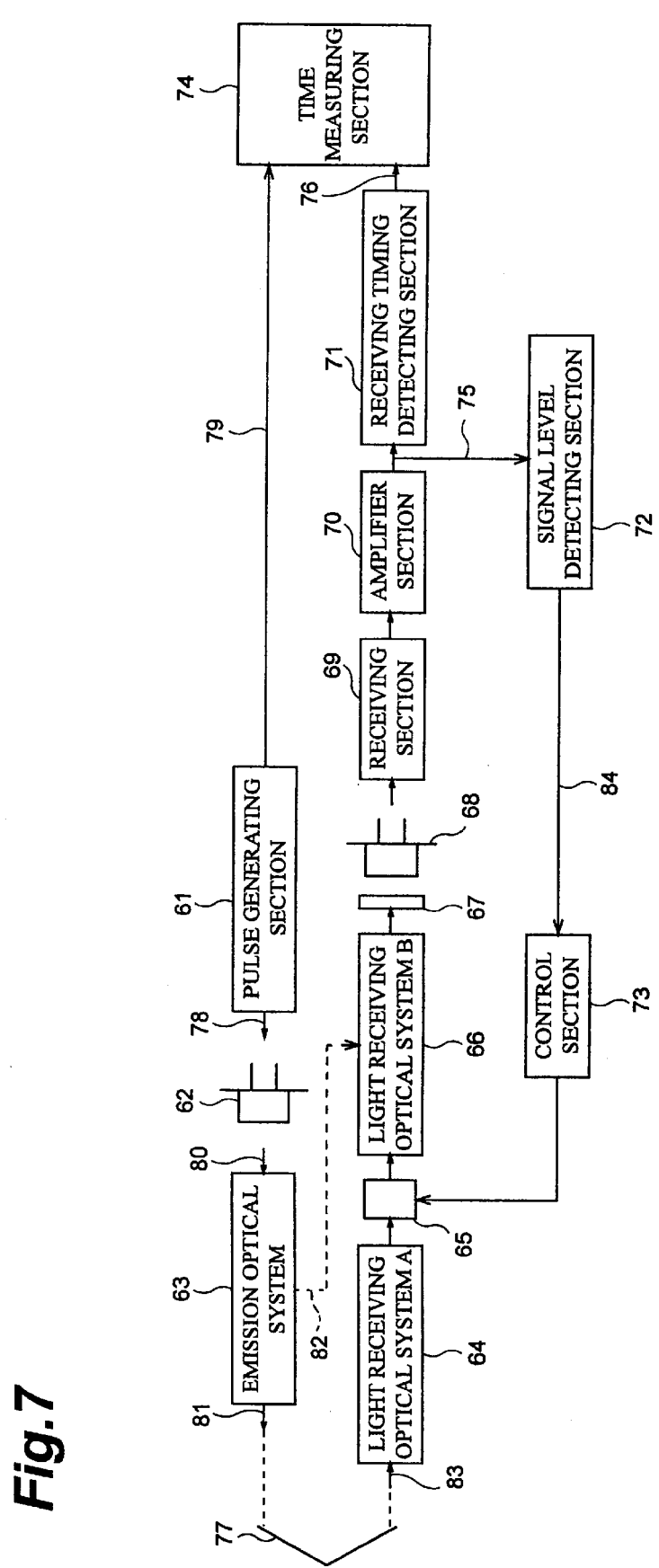
FIG. 7 is a block diagram showing a configuration of a reference example for explaining effects of the distance measuring apparatus according to the present invention.

FIG. 7 shows an overall block diagram of a distance measuring apparatus as a reference example. In this apparatus, as with the apparatus shown in FIG. 2, a distance measuring system comprises a structure for adjusting the light quantity of a reflected pulse to a standard level and a structure for measuring the difference in time between the emitted pulse and the reflected pulse.

First, a pulse generating section 61 outputs, in synchronization with an edge of an output signal of an oscillator disposed therein, a drive signal 78 for driving a laser diode 62. In response to the drive signal 78, the laser diode 62 emits a light pulse 80 into an emission optical system 63. According to an instruction from a microcomputer, the emission optical system 63 selects one of a measurement optical path or a reference optical path within the apparatus, and emits measurement pulse light 81 or reference pulse light 82 into thus selected optical path.

The measurement pulse light 81 emitted to the measurement optical path irradiates a target 77 located at a distance measuring point. A part (reflected component 83) of the measurement pulse light 81 reflected by the target 77 is collected by a light receiving optical system A 64 and passes through a light quantity adjusting mechanism 65 constituted by an optical attenuator or the like, a light receiving optical system B 66, and an optical filter 67, so as to reach a light receiving surface of an avalanche photodiode 68. Thus reaching light component is photoelectrically converted by the avalanche photodiode 68 into an electric signal, which is then converted by a receiving section 69 into a voltage, and the resulting voltage signal is amplified by an amplifier section 70. Thus amplified signal is sent to a receiving timing detecting section 71 and a signal level detecting section 72. On the other hand, the reference pulse light 82 emitted to the reference optical path within the apparatus propagates through the reference optical path so as to be directly received by the light receiving optical system B 66.

The detected light quantity of the reflected component 83 of the measurement pulse light 81 that propagates through the measurement optical path may vary greatly depending on the reflectivity of the target 77 and the distance thereto. As a consequence, light quantity equilibration is carried out such that thus detected light quantity quals the detected light quantity of the reference pulse light 82 that has been set to a predetermined standard level beforehand.

The signal level detecting section 72, which is constituted by a peak detecting circuit for holding the peak level of output pulse 75 of the amplifier section 70, outputs to a control section 73 a signal 84 indicative of a voltage in proportion to thus held peak level. The control section 73, which is constituted by a microcomputer, a motor, and the like, compares output levels 84 from the signal level detecting section 72 respectively corresponding to the received reference pulse light 82 after propagating through the reference optical path and the received reflected component 83 after propagating through the measurement optical path. Then, the control section 73 rotates the optical attenuator included in the light quantity adjusting mechanism 65, such that these two output levels become identical to each other, thereby adjusting the detected light quantity of the reflected component 83. As a consequence of this light quantity equilibration, the light quantity of the reflected component 83 and that of the reference pulse light 82 can be made equal to each other, thereby equalizing delay characteristics within the receiving circuit for both of the optical paths.

After the difference in received signal levels between the reference pulse light 82 and reflected component 83 of the measurement pulse light falls within a predetermined tolerance due to the above-mentioned light quantity equilibration, time measurement is effected by a microcomputer (including a time measuring section 74). In the time measurement, of the pulse light 80 generated by the laser diode 62 in response to the drive signal 78 caused by the pulse generating section 61, the measurement pulse light 81 is emitted to the measurement optical path by way of the emission optical system 63. At the same time, a measurement start signal 79 is supplied to the time measuring section 74.

On the other hand, the reflected component 83 of the measurement pulse light 81 reflected by the target 77 is photoelectrically converted by the avalanche photodiode 68 in a manner similar to that mentioned above. The output 75 of the amplifier section 70 set to an appropriate amplitude level by the light quantity equilibration is sent to the receiving timing detecting section 71. The receiving timing detecting section 71, which is constituted by a comparator, a differentiating circuit, and the like, detects a peak timing of its input signal 75 and sends thus detected receiving timing signal to the time measuring section 74.

Then, the time measuring section 74 measures the difference between the respective points of time at which the measurement start signal 79 and the receiving timing signal 76 are generated, and computes the distance from the apparatus to the target 77 according to an operation based on thus measured values and the velocity of light. Here, the electric delay time within the apparatus is canceled when, after a similar time difference measuring operation is carried out for the reference optical path, the difference from the measured time difference value that has been obtained in the measurement optical path is taken out.

In the reference example of FIG. 7, due to the foregoing configuration, though the measurement pulse light 81 emitted from the emission optical system 63 impinges on the target 77 within a beam area determined by the optical system, there may occur a situation in which a plurality of reflected pulses 83 are received when the target has a very high reflectivity as with a prism such that the reflected light from the prism is reflected by the emission optical system 63 or the light receiving optical system A 64 so as to occur multiple reflection directed toward the prism again, or when an object having a high reflectivity exists behind the target.

In this case, due to the effect of the peak detecting circuit, the light quantity equilibration is carried out for the reflected pulse yielding the largest detected light quantity among the received plurality of reflected pulses 83. As a result, there may occur cases where the distance to the closest target within the beam area of the light pulse cannot be determined correctly. An example of such cases will be explained in detail in the following.

As a first problem in the reference example of FIG. 7, FIGS. 8A to 8D show waveforms of respective parts in the case where an object having a high reflectivity exists behind a target located at a measuring point.

Figure 8A:
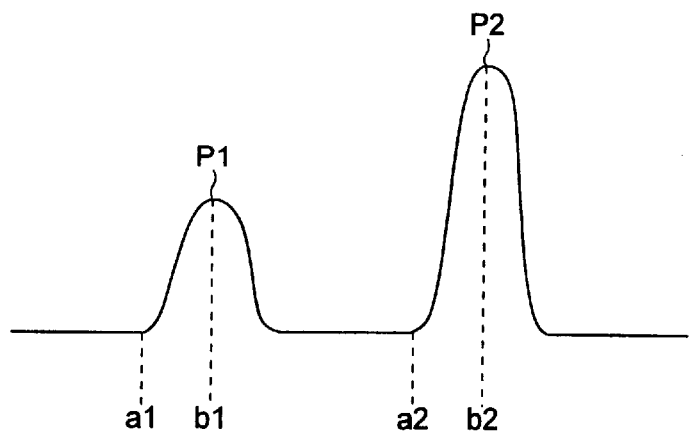

The waveform of FIG. 8A indicates the output 75 of the amplifier section 70, before the light quantity equilibration, in response to the reflected component 83 propagating through the measurement optical path. The first pulse P1 indicates the pulse reflected by the target, whereas the second pulse P2 indicates the pulse reflected by the object having a high reflectivity located behind the target. In this example, since the object having a high reflectivity exists behind the target, the second pulse P2 has a peak level much higher than that of the first pulse P1.

Figure 8B:
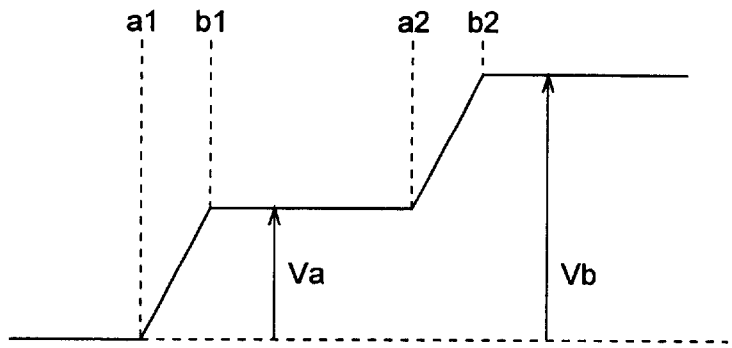

The waveform of FIG. 8B indicates the output 84 of the signal level detecting section 72 in response to the output 75 in FIG. 8A. Since the signal level detecting section 72 is constituted by a peak level detecting circuit, it once holds the peak level $V_a$ of the reflected pulse P1 having a low level initially arriving at the avalanche photodiode 68, and then holds the peak level $V_b$ of the second reflected pulse P2 having a higher peak level. In FIGS. 8A and 8B, a1, b1, a2, and b2 each indicate the same timing.

Figure 8C:
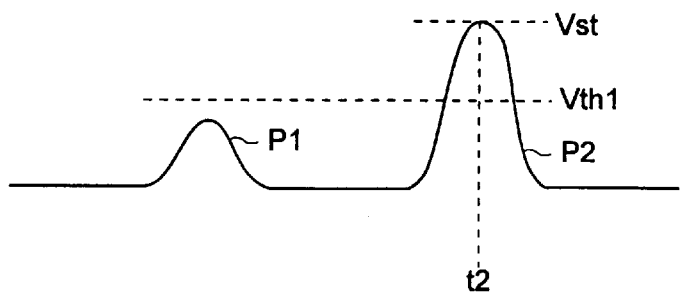

The waveform of FIG. 8C indicates the output 75 of the amplifier section 70, after the light quantity equilibration, in response to the reflected component propagating through the measurement optical path. Since the light quantity equilibration is carried out on the basis of the second reflected pulse P2 having a higher peak level, the amplitude level of the output 75 of the amplifier section 70 after the light quantity equilibration is such that the second reflected pulse P2 is attenuated to the standard level $V_{st}$, and the first reflected pulse P1 is further attenuated in response thereto.

Figure 8D:
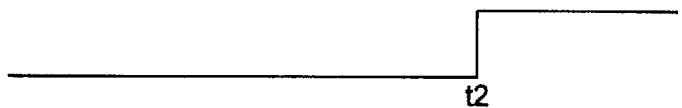

The waveform of FIG. 8D indicates the output 76 of the receiving timing detecting section 71 in response to the output 75 in FIG. 8C. The receiving timing detecting section 71 detects, as a receiving timing, the peak point of time in the case where the output pulse 75 of the amplifier section 70 exceeds the threshold level $V_{th1}$. Accordingly, the receiving timing detecting section 71 cannot detect the greatly attenuated pulse P1 from the target but the peak point of time t2 of the second reflected pulse P2 from the object having a high reflectivity located behind the target as a receiving timing. Consequently, the distance measuring apparatus in FIG. 7 computes, instead of the distance to the original target, the distance to the object having a high reflectivity located behind the target as measurement data.

As a second problem in the reference example of FIG. 7, FIGS. 9A to 9D show the case where the receiving timing fluctuates when an object having a high reflectivity exists behind a target located at a measuring point.

Figure 9A:
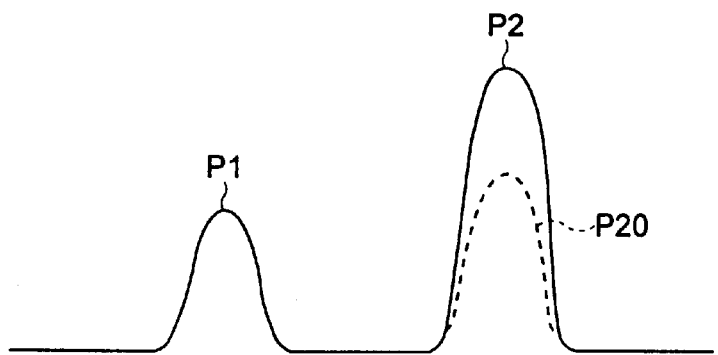

The waveform of FIG. 9A indicates the output 75 of the amplifier section 70, before the light quantity equilibration, in response to the reflected component 83 propagating through the measurement optical path. As with the above-mentioned FIGS. 8A to 8D, it indicates the case where the second pulse P2 or the like has a peak level higher than that of the first pulse P1. Here, of the second reflected pulses, the pulse P2 depicted by solid line is much larger than the first pulse P1 due to a high reflectivity of the object behind the target, whereas the pulse P20 depicted by dotted line indicates the case where it is slightly larger than the first pulse P1. Depending on changes in the measurement environment such as changes in the posture of the object located behind the target to be detected, there are cases where the second reflected pulse may become the pulse P2 or pulse P20 upon a plurality of measuring operations.

Figure 9B:
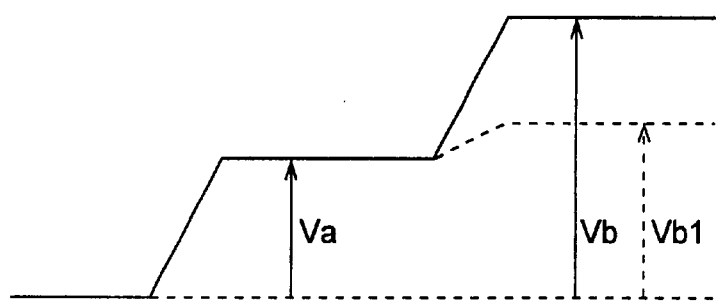

The waveform of FIG. 9B indicates the output 84 of the signal level detecting section 72 in response to the output 75 in FIG. 9A. In the case where the second pulse P20 in FIG. 9A is represented by dotted line so as to be slightly greater than the first pulse P1, the difference between the peak level $V_a$ of the first pulse P1 and the peak level $V_{b1}$ of the second pulse P20 is small.

Figure 9C:
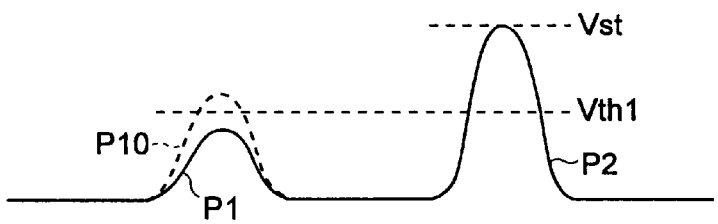

The waveform of FIG. 9C indicates the output 75 of the amplifier section 70, after the light quantity equilibration, in response to the reflected component 83 propagating through the measurement optical path. Since the second pulse is greater than the first pulse P1 whether indicated by solid line as P2 or dotted line as P20, the light quantity equilibration is effected on the basis of the second pulse P2 or P20. Accordingly, in the output 75 of the amplifier section 70, the second reflected pulse coincides with the standard level $V_{st}$.

Here, since the level difference between the dotted second pulse P20 and the first pulse P1 is small, even when the light quantity equilibration is carried out such that the second pulse P20 coincides with the standard level $V_{st}$, the first pulse P1 is not considerably attenuated from the standard level $V_{st}$, thereby the first pulse in FIG. 9C may exceed the threshold level $V_{th1}$ of the receiving timing detecting section 71 as indicated by dotted line P10. By contrast, when the light quantity is equilibrated such that the second pulse P2 coincides with the standard level $V_{st}$, the first pulse P1 would not exceed the threshold level $V_{th1}$ after the light quantity equilibration.

Figure 9D:

The waveform of FIG. 9D indicates the output 76 of the receiving timing detecting section 71 in response to the output 75 in FIG. 9C. In this case, there is a possibility of the receiving timing detecting section 71 outputting a dotted line t1 indicative of the peak timing of the first pulse P1 as a receiving timing. Namely, it outputs the receiving timing t1 of the first pulse P10 when the peak level of the first pulse P10 in FIG. 9C is higher than the threshold level $V_{th1}$, and outputs the receiving timing t2 of the second pulse P2 when the peak level of the first pulse P10 is lower than the threshold level $V_{th1}$. When the first signal level shifts up and down from the threshold level $V_{th1}$ due to fluctuations in light quantity and the like, the receiving timing may fluctuate greatly, thereby the measured value of distance is variable to a large extent.

In general, upon distance measurement, there are cases where a distance to a target is measured a plurality of times, and then the average thereof is defined as the measured value of distance. In such a case, when the signal level of the first pulse P10 exceeds the threshold level $V_{th1}$ for some times, the distance corresponding to the first pulse P10 is outputted for the same number of times, whereas the distance corresponding to the second pulse P2 is outputted for the rest of times where the signal level of the first pulse P1 does not exceed the threshold level $V_{th1}$. Accordingly, depending on the ratio of thus detected times, outputted is the average value of distances respectively corresponding to the first and second pulse signals, i.e., the intermediate distance between the distance to the target and the distance to the object having a high reflectivity located behind the target. When the intermediate distance between the above-mentioned distances is outputted, the distance to a nonexistent object is outputted, thus yielding a serious problem.

By contrast, in the distance measuring apparatus according to the present invention, even when a large second reflected pulse arrives from an object having a high reflectivity located behind the target as with the first problem, the light quantity equilibration is not carried out on the basis of the second pulse, whereby the first pulse, which is the reflected pulse from the target, would not be attenuated.

Also, in the distance measuring apparatus according to the present invention, even when an object having a high reflectivity exists behind the target to be detected, while the peak level from the reflected pulse from the object changes, an erroneous operation in which the intermediate distance between the object and the target is determined as the measured value of distance can be prevented.

Though the embodiments of the present invention indicate a type in which the signal level is changed on the input side of the signal level detecting section 14, without being restricted thereto, similar effects can also be obtained in a configuration in which a sample-and-hold circuit is disposed on the output side of the signal level detecting section 14 such that the sample-and-hold circuit is held at the falling edge of the first pulse signal. Similar effects can also be obtained when the signal level detecting section 14 itself has a signal edge detecting function and a signal level changing function.

As explained in the foregoing, in accordance with the present invention, since the light quantity control system carries out the light quantity equilibration such that the pulse reflected from the first target becomes the standard level, the distance to the first target can always be measured correctly.

Further, since there is no level control of the signal path concerning the operation for the measured value of distance, a configuration not influenced by switching noise upon level control can be obtained, thus yielding the measured value of distance with a high accuracy.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A distance measuring apparatus, comprising:
   a pulse emission system having a light source repeatedly emitting a measurement pulse and a reference pulse into a measurement optical path and a reference optical path, respectively;
   a pulse receiving system having an optoelectric converter converting reflected pulse components, which correspond to said measurement pulse and reach said pulse receiving system by way of said measurement optical path, into measurement electric signal components, and converting said reference pulse, which is emitted from said pulse emission system and reaches said pulse receiving system by way of said reference optical path, into a reference electric signal: said measurement electric signal components including:

a first signal component corresponding to a first reflected pulse component within said reflected pulse component, said first reflected pulse component reflected by a target in said measurement optical path and initially received by said optoelectric converter; and second signal components corresponding to one or more second reflected pulse components within said reflected pulse components, said second reflected pulse components reflected by an object other than said target and received by said optoelectric converter after reception of said first reflected pulse component;

a light quantity control system for comparing a level of said first signal component with a level of said reference electric signal while blocking or attenuating said second signal components, and controlling a light quantity of said fist reflected pulse component such that said first signal component is equilibrated to said reference electric signal; and a time measuring system measuring a period of time from when said measurement pulse is emitted from said pulse emission system until said first reflected pulse component whose light quantity is controlled reaches said pulse receiving system.

2. A distance measuring apparatus according to claim 1, further comprising a light quantity adjusting system controlling a light quantity of said first reflected pulse component; and wherein said light quantity control system has a signal level changing section immediately making its electric gain decrease or become zero after said first pulse component reaches said pulse receiving system, and controls said light quantity adjusting system so as for the level of said first signal component to be equal to the level of said reference electric signal.

3. A distance measuring apparatus, comprising:

a pulse emission system having a light source repeatedly emitting a measurement pulse and a reference pulse into a measurement optical path and a reference optical path, respectively;

a pulse receiving system having an optoelectric converter converting a plurality of multi-reflected pulse component, which corresponds to said measurement pulse and reaches said pulse receiving system by way of said measurement optical path, into measurement electric signal components, and converting said reference pulse, which is emitted from said pulse emission system and reaches said pulse receiving system by way of said reference optical path, into a reference electric signal: said measurement electric signal components including:

a first signal component corresponding to a first reflected pulse component within said multi-reflected pulse components, said first reflected pulse component initially reaching said pulse receiving system by way of said measurement optical path; and second signal components corresponding to one or more second reflected pulse components within said multi-reflected components, said second reflected pulse components being remaining components without said first reflected pulse component and reaching said pulse receiving system after said first reflected pulse component;

a light quantity control system for comparing a level of said first signal component with a level of said reference electric signal while blocking or attenuating said second signal components, and controlling a light quantity of said first reflected pulse component such that said first signal component is equilibrated to said reference electric signal; and a time measuring system measuring a period of time from when said measurement pulse is emitted from said pulse emission system until said first reflected pulse component whose light quantity is controlled reaches said pulse receiving system.

4. A distance measuring apparatus according to claim 3, further comprising a light quantity adjusting system controlling a light quantity of said first reflected pulse component; and wherein said light quantity control system has a signal level changing section immediately making its electric gain decrease or become zero after said first reflected pulse component reaches said pulse receiving system, and controls said light quantity adjusting system so as for the level of said first signal component to be equal to the level of said reference electric signal.

5. A distance measuring apparatus, comprising:

a pulse emission system having a light source repeatedly emitting a measurement pulse toward a target;

a pulse receiving system having an optoelectric converter converting reflected pulse components which correspond to said measurement pulse into measurement electric signal components; said measurement electric signal components including:

a first signal component corresponding to a first reflected pulse component within said reflected pulse components, said first reflected pulse component reflected by said target; and second signal components corresponding to one or more second reflected pulse components within said reflected pulse components, said second reflected pulse components reflected by an object other than said target and received by said optoelectric converter after reception of said first reflected pulse component;

a light quantity control system for comparing a level of said first signal component and a predetermined reference level while removing said second signal components, and controlling a light quantity of said first reflected pulse component such that said first signal component is equilibrated to said predetermined reference level; and a time measuring system measuring a period of time from when said measurement pulse is emitted from said pulse emission system until said first reflected pulse component whose light quantity is controlled reaches said pulse receiving system.

6. A distance measuring apparatus according to claim 5, further comprising a light quantity adjusting system controlling a light quantity of said first reflected pulse component; and wherein said light quantity control system has a signal level changing section immediately making its electric gain decrease or become zero after said first reflected pulse component reaches said pulse receiving system, and controls said light quantity adjusting system so as for the level of said first signal component to be equal to said predetermined reference level.

7. A distance measuring method, comprising the steps of;

repeatedly emitting a measurement pulse and a reference pulse into a measurement optical path an a reference optical path, respectively;

converting reflected pulse components corresponding to said measurement pulse propagating through said measurement optical path and said reference pulse propagating through said reference optical path into measurement electric signal components and a reference electric signal, respectively: said measurement electric signal components including:
- a first signal component corresponding to a first reflected pulse component within said reflected pulse components, said first reflected pulse component reflected by a target in said measurement optical path; and
- second signal components corresponding to one or more second reflected pulse components within said reflected pulse components, said second reflected pulse components reflected by an object other than said target after reception of said first reflected pulse component, comparing a level of said first signal component and a level of said reference electric signal while blocking or attenuating said second signal components, and controlling a light quantity of said first reflected pulse component such that said first signal component is equilibrated to said reference electric signal; and measuring a period of time from when said measurement pulse is emitted until said first reflected pulse component whose light quantity is controlled is received.

* * * * *